US 6,751,067 B2

(12) United States Patent  
Kim

(10) Patent No.: US 6,751,067 B2  
(45) Date of Patent: Jun. 15, 2004

(54) ACTUATOR LATCH OF HARD DISK DRIVE

(75) Inventor: Do-wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 10/155,113

(22) Filed: May 28, 2002

(65) Prior Publication Data

US 2002/0176211 A1 Nov. 28, 2002

(30) Foreign Application Priority Data

May 26, 2001 (KR) ................. 10-2001-0029254

(51) Int. Cl.⁷ ............................................... G11B 21/22
(52) U.S. Cl. ..................................................... 360/256.3
(58) Field of Search ...................................... 360/256.3

(56) References Cited

U.S. PATENT DOCUMENTS

| 4,985,793 A | 1/1991 | Anderson |
| 5,381,290 A | 1/1995 | Cheng |
| 6,147,841 A | 11/2000 | Rao |
| 6,198,603 B1 | 3/2001 | West |

FOREIGN PATENT DOCUMENTS

| JP | 2-76368 | 6/1990 |
| JP | 3-5264 | 1/1991 |
| JP | 9-22568 | 1/1997 |
| JP | 2000-251424 | 9/2000 |
| KR | 1999-61734 | 7/1999 |

Primary Examiner—A. J. Heinz  
Assistant Examiner—Mark Blouin  
(74) Attorney, Agent, or Firm—Staas & Halsey LLP

(57) ABSTRACT

An actuator latch of a hard disk drive to lock an actuator so that the actuator does not rotate when a magnetic head installed at the actuator driven by a voice coil motor is positioned on a parking region. The actuator latch has: a locking protrusion installed at the actuator, a latch member rotatably installed on the basis of a predetermined rotation axis, the latch member rotating with the rotation of the actuator when the magnetic head is parked so that a hook intercepts the locking protrusion and prevents it from moving in an opposite direction to a parking side, and a latch member driving unit rotating the latch member to release the locking protrusion from the hook. The actuator latch of a hard disk drive selectively intercepts the movement of the locking protrusion at the actuator so that the actuator is locked and unlocked. The actuator can stay strongly locked and be softly unlocked without any impact.

8 Claims, 4 Drawing Sheets

ACTUATOR LATCH OF HARD DISK DRIVE

CROSS-REFERENCE TO RELATED APPLICATIONS

This application claims the benefit of Korean Application No. 01-29254, filed May 26, 2001, in the Korean Industrial Property Office, the disclosure of which is incorporated herein by reference.

BACKGROUND OF THE INVENTION

1. Field of the Invention

The present invention relates to an actuator latch of a hard disk drive to lock a magnetic head in a parking region in a magnetic head transfer mechanism of the hard disk drive.

2. Description of the Related Art

In general, as illustrated in FIG. 1, a hard disk drive includes a hard disk 20 and a magnetic head transfer mechanism. The hard disk 20, in which predetermined data is recorded, is rotatably installed on a base 10. The transfer mechanism transfers a magnetic head 50 to a desired track on the hard disk 20 to record and reproduce data. Here, the hard disk 20 is divided into a recording region 22 to record data and a parking region 21 on which the magnetic head 50 arrives when the rotation of the hard disk 20 stops. The magnetic transfer mechanism includes an actuator 30, a voice coil motor, and a latch. The actuator 30, in which the magnetic head 50 is installed, rotates around a rotation axis 34 on the base 10. The voice coil motor rotates the actuator 30 with an electromagnetic force. The latch locks the actuator 30 after the magnetic head 50 arrives on the parking region 21.

The actuator 30 includes a suspension portion 31, an arm 32, and a bobbin 33. The suspension portion 31 suspends the magnetic head 50. The arm 32 is rotatably combined with the rotation axis 34. A movable coil 35 of the voice coil motor is wound around the bobbin 35. The voice coil motor includes the movable coil 35 and a magnet 41, which is attached to a yoke 40 installed on the base 10 and generates a magnetic flux. The actuator 30 is placed between a pair of the yokes 40, not shown in FIG. 1. An electromagnetic force occurs due to the interaction between the magnetic flux generated by the magnet 41 and current flowing through the movable coil 35. As a result, the actuator 30 rotates in a direction according to Fleming's left-hand law. The latch locks the actuator 30 so that the actuator 30 does not move after the magnetic head 50 arrives on the parking region 21 as described previously. The latch includes a magnetic member 43, a damper 60, and an iron separation element 61. The magnetic member 43 is installed on the yoke 40 and magnetized by the magnet 41. The damper 60 is inserted into a protrusion 36 at the end of the bobbin 33 of the actuator 30. The iron separation element 61 is coupled to an end of the damper 60. Thus, if the actuator 30 rotates and the magnetic head 50 installed at the suspension portion 31 enters the parking region 21 of the hard disk 20, the iron separation element 61 coupled to one side of the bobbin 33 sticks to the magnetic member 43 as illustrated in FIG. 1. The actuator 30 remains locked due to the magnetic combination of the iron separation element 61 and the magnetic member 43 until the electromagnetic force that rotates the actuator 30 operates again. The reason for locking the actuator 30 will be described below.

The suspension portion 31 to suspend the magnetic head 50 provides an elastic force biasing the magnetic head 50 toward the horizontal plane of the hard disk 20. Thus, the magnetic head 50, to which an external force is not applied, keeps sticking closely on the horizontal plane of the hard disk 20. However, if the rotation of the hard disk 20 begins, air moves around the magnetic head 50 due to the rotation of the hard disk 20. The movement of air generates a lift force that lifts the magnetic head 50 from the horizontal plane of the hard disk 20. Thus, since the hard disk 20 is rotating when data is recorded on or read from the recording region 22 of the hard disk 20, the magnetic head 50 glides a predetermined distance above the horizontal plane of the hard disk 20. Thus, scratches due to the friction between the recording region 22 and the magnetic head 50 do not occur on the recording region 22.

However, if the rotation of the hard disk 20 completely stops as when power is turned off, the lift force that lifts the magnetic head 50 disappears. Thus, the actuator 30 rotates so that the magnetic head 50 is positioned on the parking region 21 before the lift force disappears. As a result, the magnetic head 50 safely arrives in the parking region 21, which is not related to recording and/or reproducing data, and thus does not have a negative effect on the recording region 22 although the lift force disappears as the rotation of the hard disk 20 stops.

However, if the magnetic head 50 is pushed toward the recording region 22 due to an impact after the magnetic head 50 safely arrives on the parking region 21, the magnetic head 50 keeps touching the recording region 22 until the magnetic head 50 is lifted again when the hard disk 20 is re-driven. As a result, scratches may occur on the recording region 22. Hence, in order to solve this problem, the actuator 30 is locked using the latch so that the actuator 30 does not rotate although impact may be inflicted.

However, in this conventional latch, the actuator 30 is locked by a magnetic force which couples the magnetic member 43 to the iron separation element 61. Thus, the actuator 30 is unlocked if a force greater than the magnetic force of the magnetic member 43 is applied. Also, the actuator 30 is unlocked and begins moving when the electromagnetic force generated between the movable coil 35 and the magnet 41 exceeds the combination force due to the magnetic force between the iron separation element 61 and the magnetic member 43 to re-rotate the locked actuator 30. And, if the magnetic combination force between the iron separation element 61 and the magnetic member 43 is too small, the actuator 30 is easily unlocked even by a small impact. If the magnetic combination force between the iron separation element 61 and the magnetic member 43 is too great, the actuator 30 may not be unlocked even if the maximum electromagnetic force occurs to rotate the actuator 30. In the above-described structure, the actuator 30 springs out sharply due to inertia when the actuator 30 is unlocked by overcoming the magnetic combination force. Thus, the protrusion 36 may strongly crash against a stopper 42 opposite to the magnetic member 43. If the actuator 30 crashes against the stopper 42, head slap may occur due to the crash impact. Thus, to prevent the head slap, the application of current to the movable coil 35 is controlled so that the actuator 30 is unlocked and supplied with a damping force.

It is difficult to design a control system since the timing to unlock the actuator 30 and supply the damping force to the actuator 30 is accurately set. Also, due to repetitive locking and unlocking operations, the damper 60 is under continuous stress and it may be destroyed.

Japanese Utility Model Publication No. 2-76368 discloses an actuator which is locked by coupling a magnet of a voice coil motor to a magnetic member at a side of the actuator with a magnetic combination force. The actuator presents the danger of head slap.

Korea Patent Publication No. 99-61734 discloses an actuator which is unlocked by biasing a latch to lock the actuator in a locking direction using a spring and selectively drive the latch in a direction opposite to a spring force using an electromagnet. The locking may not be strongly maintained due to the deterioration of the elasticity of the spring if the actuator is used for a long time.

Japanese Patent Publication No. 9-22568 discloses a latch which is locked and unlocked by a complicated electromagnetic mechanism including a permanent magnet, a low magnetoresistance device, and a coil. There are problems in that the complicated electromagnetic mechanism is additionally installed and occupies a wide space.

Japanese Utility Mode Publication No. 3-5264 discloses a latch which is locked and unlocked by an electromagnetic mechanism including a permanent magnet and an electromagnet. There are problems in that the complicated electromagnetic mechanism is additionally installed and occupies a wide space.

SUMMARY OF THE INVENTION

Accordingly, it is an object of the present invention to provide a magnetic head used with a hard disk drive having an improved structure to strongly keep an actuator locked and softly perform operations of locking and unlocking.

Additional objects and advantages of the invention will be set forth in part in the description which follows and, in part, will be obvious from the description, or may be learned by practice of the invention.

The foregoing and other objects of the present invention are achieved by providing an actuator latch of a hard disk drive to lock an actuator so that the actuator does not rotate when a magnetic head, installed at the actuator and driven by a voice coil motor, is positioned in a parking region. The actuator latch comprises: a locking protrusion installed at the actuator; a latch member rotatably installed on the basis of a predetermined rotation axis, the latch member to rotate with the rotation of the actuator when the magnetic head is parked so that a hook intercepts the locking protrusion and prevents it from moving in an opposite direction to a parking side; and a latch member driving unit to rotate the latch member to release the locking protrusion from the hook.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
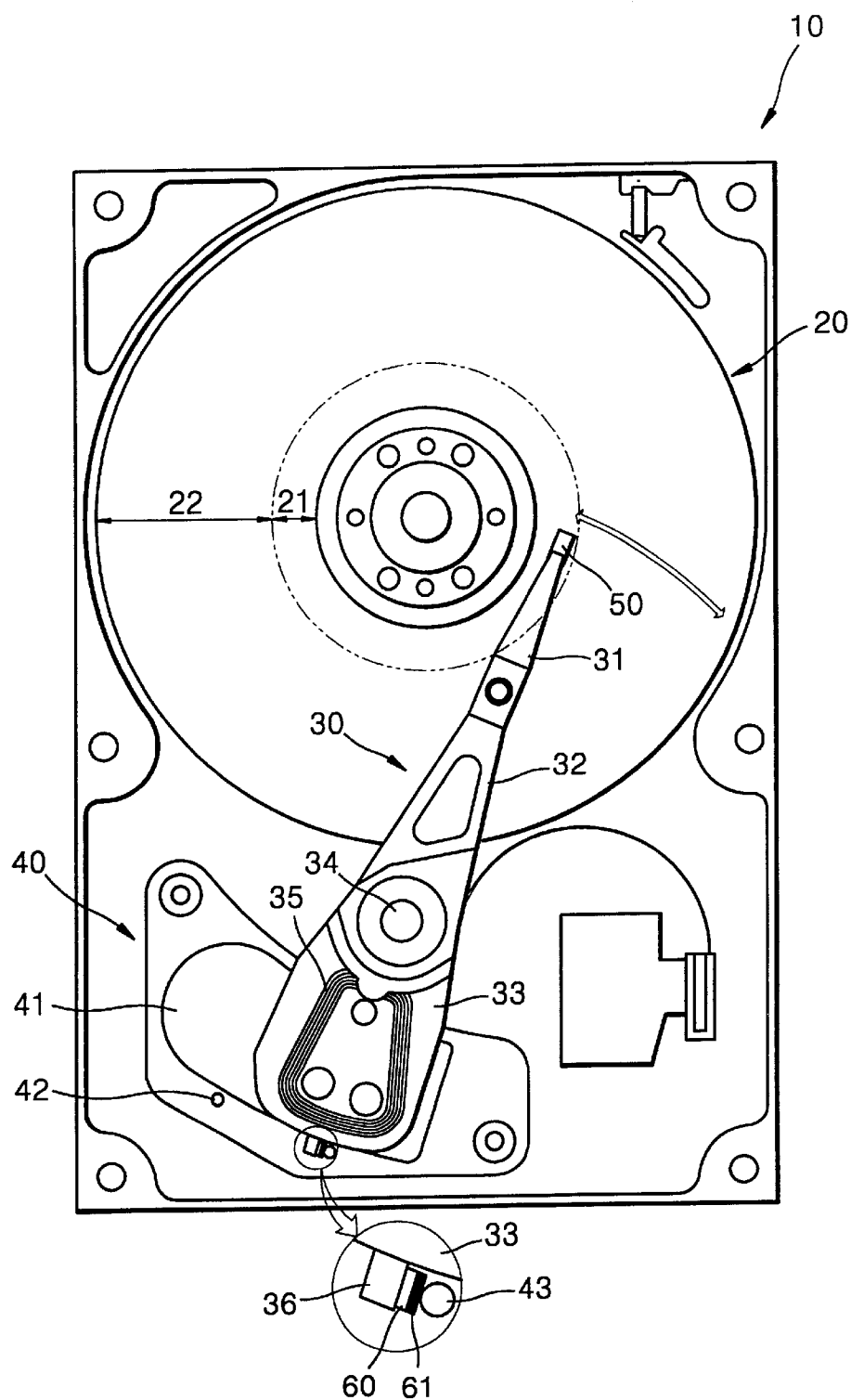
FIG. 1 is a plan view of a hard disk drive including a conventional actuator latch.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
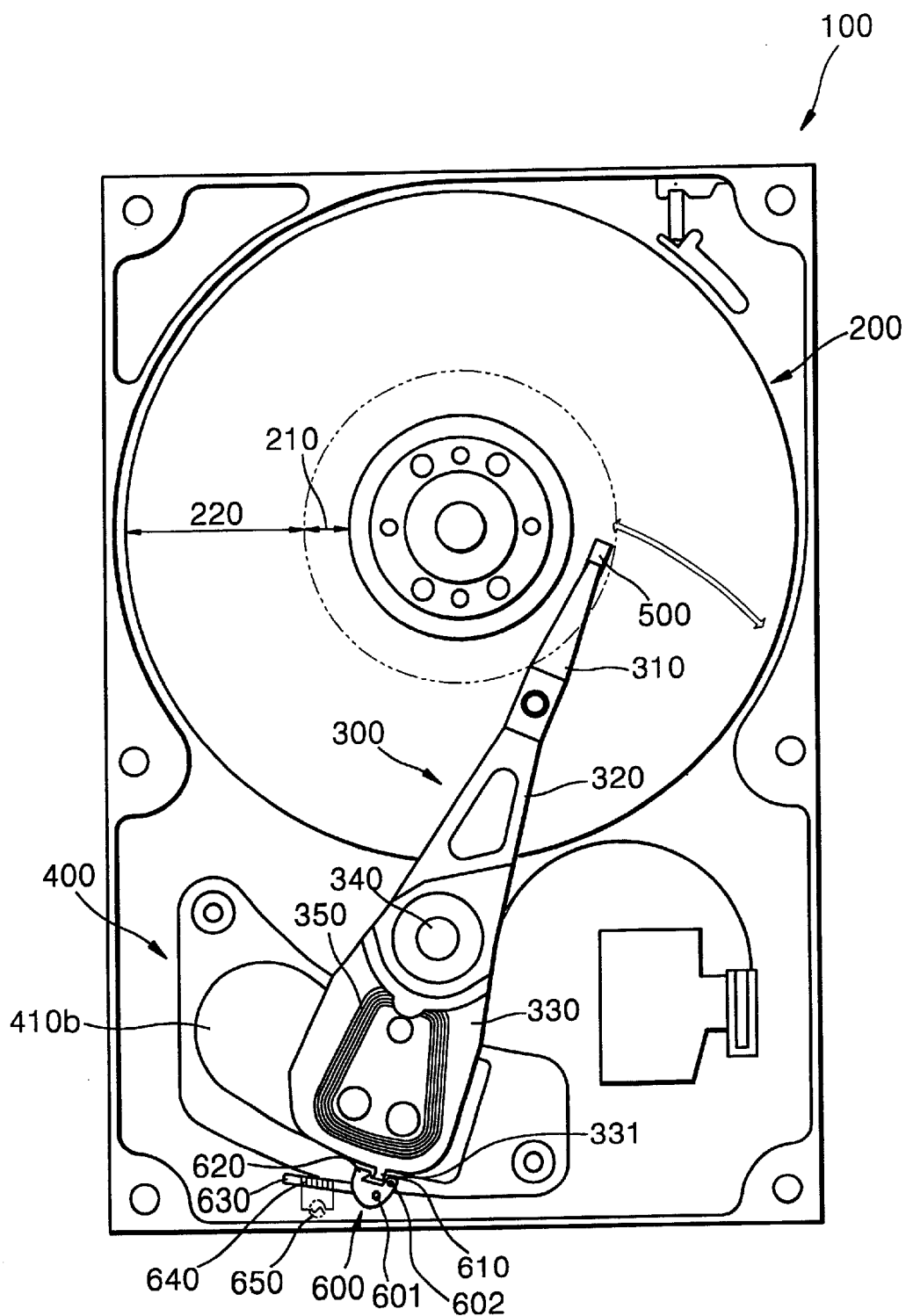
FIG. 2 is a plan view of hard disk drive including an actuator latch according to an embodiment of the present invention.
Figure 3:
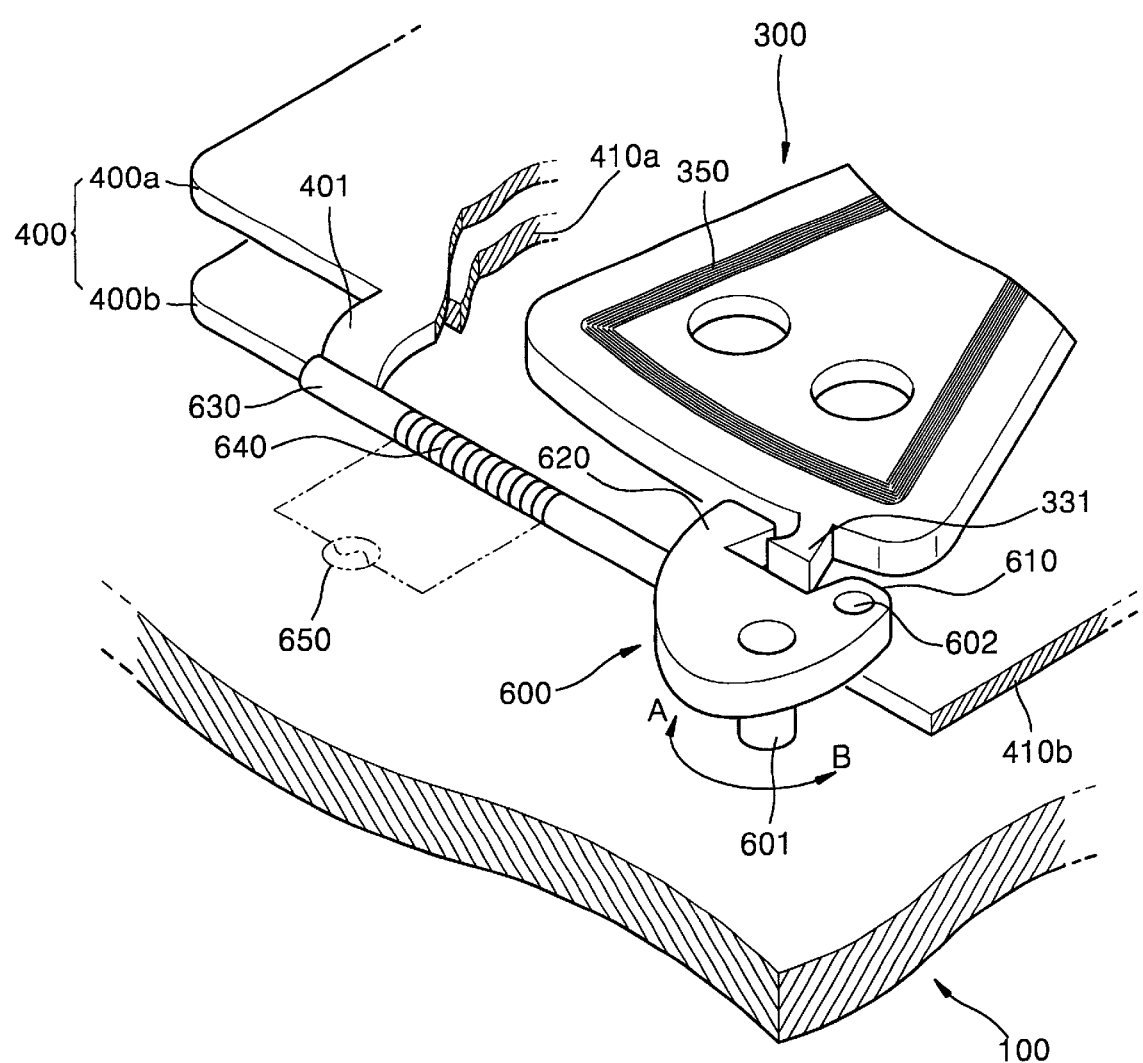
FIG. 3 is a perspective view of a portion of the actuator latch illustrated in FIG. 2.

FIGS. 2 and 3 illustrate a hard disk drive including an actuator latch according to an embodiment of the present invention. Referring to FIG. 2, a magnetic head transfer mechanism includes an actuator 300 and a voice coil motor. The actuator 300 having a magnetic head 500 at an end thereof is installed on a base 100, on which a hard disk 200 is rotatably installed. The voice coil motor rotates the actuator 300 so that the magnetic head 500 moves on a parking region 210 and a recording region 220 on the hard disk 200. Here, the actuator 300 includes a suspension portion 310, an arm 320, and a bobbin 330. The suspension portion 310 suspends the magnetic head 500. The arm 320 is coupled to a rotation axis 340 on the base 100. A movable coil 350 of the voice coil motor is wound around the bobbin 330. The voice coil motor includes the movable coil 350 and magnets 410a and 410b. The magnets 410a and 410b are installed on a yoke 400 on the base 100 and generate magnetic flux. As illustrated in FIG. 3, the actuator 300 lies between the upper and lower yokes and magnets 410a and 410b. Thus, upper and lower magnets 410a and 410b form magnetic poles on upper and lower yokes 400a and 400b. Reference numeral 401 represents a connecting portion of the upper yoke 400a, to which a lever 630 of a latch member 600 that will be described later is selectively attached and detached.

When the magnetic head 500 is positioned on the parking region 210 of the hard disk 200, a locking mechanism locks the actuator 300. The locking mechanism includes the latch member 600, a coil 640, and a power supply 650. The latch member 600 includes a locking protrusion 331 at the actuator 300, a hook 620, an impact portion 610, and the lever 630, and rotates on the basis of a rotation axis 601. The coil 640 is wound around the lever 630. The power supply 650 supplies the coil 640 with current. The lever 630 is formed of a metallic material having a magnetic polarity due to a short via the coil 640. The magnetic polarity reacts with the magnetic poles formed on the upper yoke 400a and serves as a driving force to rotate the latch member 600 if necessary. The impact portion 610 crashes against the locking protrusion 331, and is pushed when the actuator 300 rotates in a direction along which the magnetic head 500 enters the parking regions 210 so that the latch member 600 rotates simultaneously. In other words, the latch member 600 rotates with the rotation of the actuator 300 toward the parking side. As the latch member 600 rotates with the rotation of the actuator 300 toward the parking side, the hook 620 intercepts the actuator 300 at the locking protrusion 331 as it begins to move in an opposite direction. In other words, the hook 620 prevents the locking protrusion 331 from returning to an opposite direction to the direction of parking to lock the actuator 300. Reference numeral 602 represents an iron separation element installed on the latch member opposite to the lever 630 on the basis of the rotation axis 601. The iron separation element 602 receives an attraction force from the magnets 410a and 410b of the voice coil motor and the yoke 400 to keep the actuator 300 unlocked.

Figure 4:
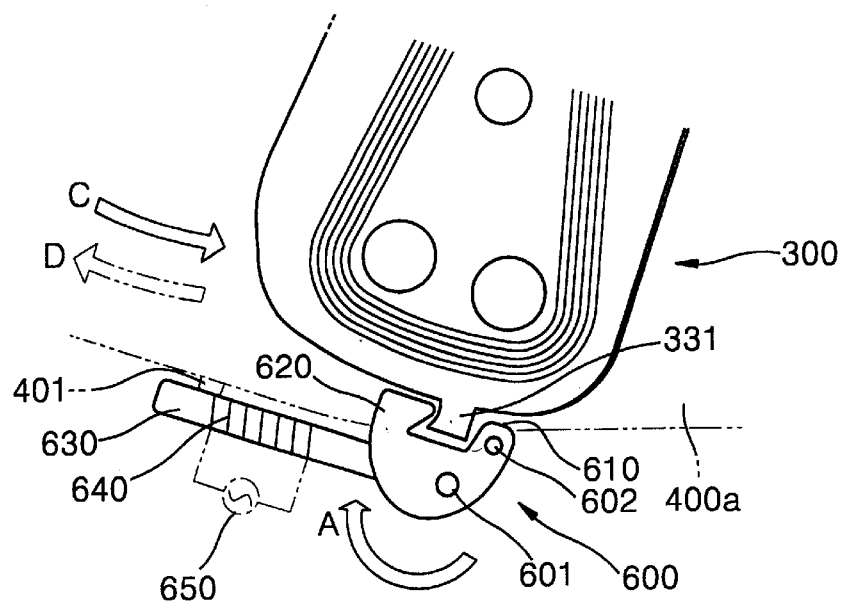
FIG. 4 is a plan view of operations of locking the actuator latch illustrated in FIG. 2.

In the above-described structure, if the hard disk 200 stops rotating when power is turned off, an electromagnetic force occurs due to the interaction between current flowing through the movable coil 350 and the magnetic flux generated from the magnet 410. Thus, as illustrated in FIG. 4, the actuator 300 rotates in direction C so that the magnetic head 500 enters the parking region 210. Here, the locking protrusion 331 pushes the impact portion 610 of the latch member 600 and rotates the latch member 600 in direction A. As a result, the lever 630 of the latch member 600 touches the connecting portion 401 of the upper yoke 400a by a magnetic force, and the hook 620 is located at a position to intercept the moving path of the locking protrusion 331 in direction D, i.e., in an opposite direction to the direction of parking. Due to the contact between the locking protrusion 331 and the hook 620, the actuator 300 rotating in direction D retracts slightly toward its own axis rotation away from the rotation axis 601 of the latch member 600. The rotation of the actuator 300 in direction D illustrated in FIG. 4 induces the rotation of the latch member 600. Thus, the locking protrusion 331 does not come off the hook 620 as long as the hook 620 is in the latched position. As a result, the actuator 300 keeps stably locked after the magnetic head 300 is positioned on the parking region 210.

Figure 5:
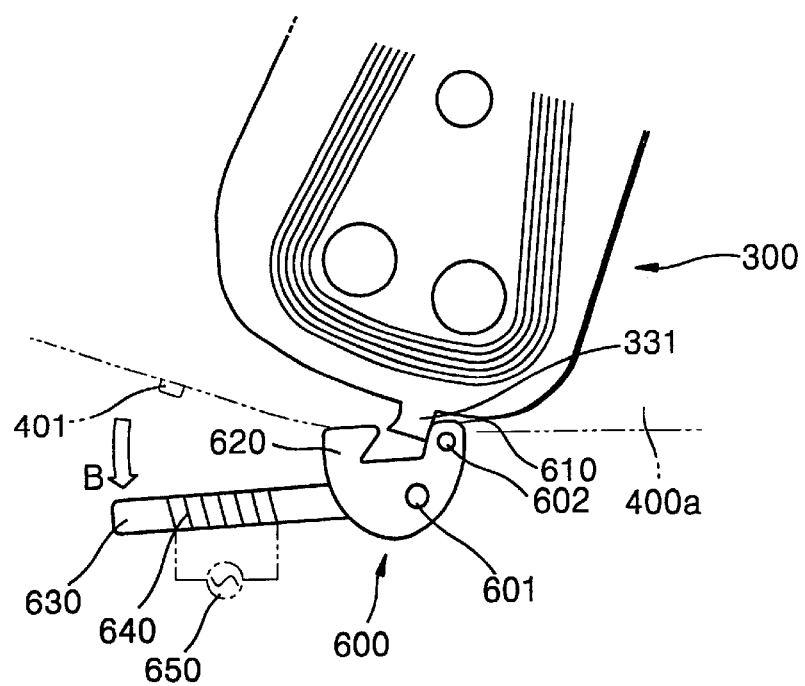
FIG. 5 is a plan view of operations of unlocking the actuator latch illustrated in FIG. 2.

If the actuator 300 is unlocked to re-use the hard disk 200, the power supply 650 supplies the coil 640 with current to form the same polarity as the connecting portion 401 at an end of the lever 630 contacting the connecting portion 401. Thus, as illustrated in FIG. 5, the latch member 600 rotates in a direction B, and the hook 620 is released from the locking protrusion 331. As a result, the actuator 300 is unlocked and thus rotates freely so that the magnetic head 500 is transferred to the recording region 220 of the hard disk 200. It is preferable that current flowing through the coil 640 stops to reduce current consumption after the actuator 300 is completely unlocked. Nevertheless, since the iron separation element 602 installed on the latch member 600 receives an attraction force from the magnets 410a and 410b of the voice coil motor and the yoke 400, the lever 630 does not come in contact with the connecting portion 401 as long as a predetermined external force is not applied.

Accordingly, the actuator latch according to the present invention is locked and unlocked when the hook 620 of the latch member 600 moves to a position to restrict the movement of the locking protrusion 331 of the actuator 300 or set the locking protrusion 331 of the actuator 300 free. Thus, the actuator latch is more softly locked and unlocked than the conventional latch based on a magnetic combination.

In other words, when the iron separation element 61 of FIG. 1 contacts the magnetic member 43 of FIG. 1 due to a magnetic force, the conventional latch comes apart from the magnetic member 43, and the locking protrusion 36 of FIG. 1 crashes against the stopper 42 of FIG. 1 due to inertia. Thus, the magnetic head 500 of FIG. 1 may be damaged. However, in the actuator latch of the present invention, if the latch member 600 rotates to set the locking protrusion 331 free, the actuator 300 can move freely. Thus, the actuator 300 is softly and stably unlocked. As a result, no impact occurs due to unlocking, and no structure to supply a damping force simultaneously while performing unlocking to prevent impact is required. Also, after the actuator 300 is locked, the actuator 300 does not move at all as long as the latch member 600 does not rotate to be unlocked. Thus, the actuator 300 can keep strongly locked.

As described above, in an actuator latch of a hard disk drive according to the present invention, the movement of a locking protrusion at an actuator is selectively intercepted so that the actuator is locked and unlocked. Thus, the actuator can stay strongly locked and be softly unlocked without any impact.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator latch of a hard disk drive to lock an actuator so that the actuator does not rotate when a magnetic head installed at the actuator driven by a voice coil motor is positioned on a parking region, the actuator latch comprising:
   a locking protrusion installed at the actuator;
   a latch member rotatably installed on the basis of a predetermined rotation axis, the latch member rotating with the rotation of the actuator when the magnetic head is parked so that a hook intercepts the locking protrusion and prevents the locking protrusion from moving in an opposite direction to a parking position; and
   a latch member driving unit rotating the latch member to release the locking protrusion from the hook, the latch member driving unit comprising
      a lever installed at the latch member to be joined with a yoke of the voice coil motor by a magnetic force when intercepting the movement path of the locking protrusion, and
      a coil forming the same polarity as the yoke with current supplied to the coil by a power supply installed at the lever.

2. The actuator latch according to claim 1, further comprising:
   an iron separation element to receive an attractive force from the voice coil motor at a side of the latch member opposite to the lever on the basis of the rotation axis.

3. The actuator latch according to claim 1, wherein an impact portion, which contacts against the locking protrusion when a parking side of the actuator rotates, is formed at the latch member and the latch member rotates with the contact of the locking protrusion against the impact portion.

4. An actuator latch used with a hard disk drive having an actuator, said actuator latch comprising:
   a locking protrusion extending from said actuator;
   a latch member having a hook portion and movable to engage with said locking protrusion at said hook portion when said locking protrusion rotates in a direction to slide said actuator towards a parking position;
   a latch member driving unit moving said latch member in a direction to disengage said hook from said locking protrusion when rotating said actuator away from the parked position;
   an impact portion contacting said locking protrusion when said actuator rotates toward the parking position and causes said latch member to engage with said locking portion and keep said actuator in the parking position;
   an electromagnetic lever protruding from the latch member to rotate said latch member in a direction to release said locking protrusion, said electromagnetic lever having a coil wound around said electromagnetic lever to create a magnetic force with magnets located on the hard drive; and
   an iron separation element positioned at said impact portion that receives an attractive force from the magnets on the hard drive to keep said latch member released from said locking protrusion.

5. The actuator latch according to claim 4, wherein said locking protrusion is formed in the shape of a hook to engage with the hook portion said latch member.

6. The actuator latch according to claim 4, wherein said latching member is movable around a rotation axis.

7. The actuator latch according to claim 4, wherein the actuator comprises a connecting portion with a certain magnetic polarity such that when a current is applied to said coil, said coil and said lever are repelled away from said connecting portion to release said latch member from said locking portion.

8. A latch member to selectively lock and release a locking protrusion positioned on an actuator of a hard disk drive, when a head of the actuator moves, respectively, into and out of a parking region of the hard disk, the latch member comprising:

a hook engaging the locking protrusion and preventing the actuator head from moving out of the parking region;

a lever, extending from the latch member, and selectively attached and detached to a connecting portion connecting upper and lower yokes of the hard disk drive;

a coil, wrapped around the lever;

a power supply installed at the lever, selectively applying current to the coil, to selectively repel the lever from the connecting portion, and release the locking protrusion;

an iron separation element, positioned at a side of the latch member opposite the lever with respect to an axis of rotation of the latch member, maintaining the latch member in a released position due to an attractive magnetic force from magnets installed on the upper and lower yokes.

* * * * *